Patented Nov. 19, 1940

2,221,826

UNITED STATES PATENT OFFICE 2,221,826

SEPARATION OF PREGNENOLONE ESTERS

Bradley Whitman, New York, N. Y., and Erwin Schwenk, Montclair, N. J., assignors to Schering Corporation, Bloomfield, N. J., a corporation of New Jersey No Drawing. Application November 21, 1938, Serial No. 241,566

14 Claims. (Cl. 260—344)

The present invention relates to the separation of $\Delta^{5,6}$-pregnenol-3-one-20 esters from mixtures containing the same, and particularly mixtures containing substances not precipitable with digitonin, and to the digitonide of pregnenolone esters obtainable in the course of the separation.

It has long been known that certain of the sterols, bile acids, and their derivatives and degradation products, will form stable compounds with digitonin. As a class of these digitonides are difficultly soluble and crystallize out of the reaction mixture. This reaction is quite specific and depends upon the presence of a hydroxyl group in the 3-position, upon the configuration of the hydroxyl, and upon the cis-trans relationship of rings A and B of the sterol molecule. All these factors must be present to induce the formation of a stable, relatively insoluble digitonide. The 3-hydroxyl must in such event be free, that is, not esterified. For example, cholesterol is quantitatively precipitated by digitonin in alcoholic solution, whereas cholesterol acetate under similar conditions is not precipitated at all. The value of this specific action of digitonin on certain 3-OH compounds having the cyclopentano polyhydrophenanthrene structure in the separation of such compounds from mixtures is well recognized.

In the working up of many kinds of crude hormone mixtures, obtained either from natural sources, such as the extracts of animal organs, body fluids, urines, or extracts of plant origin, or synthetically, for example, by the oxidation of cholesterol, as in the form of its acetate dibromide, and of other sterols and their substitution and degradation products, relatively small amounts of pregnenolone are frequently present in admixture with larger quantities of other hormones or hormone-like substances, such as dehydroandrosterone, and it is extremely difficult to separate the pregnenolone from the other substances by the methods heretofore employed. Thus, Ruzicka and Fisher (Helvetica Chimica Acta 20, 1291, 1937) isolated from the lower melting semi-carbazones obtained as a by-product in the oxidation of cholesterol acetate dibromide in acetic acid solution with chromium tri-oxide, several ketonic substances, one of which was $\Delta^{5,6}$-pregnenol-3-one-20. They accomplished this by a series of tedious re-crystallizations and it was only with considerable difficulty that they were able to isolate a small amount of pregnenolone (page 1296). We have repeated the procedure of Ruzicka and Fisher and have also found that it is extremely difficult to separate by fractional crystallization the pregnenolone from the dehydroandrosterone following the decomposition of the semi-carbazones or other condensation products with ketone reagents produced for the purpose of separating the ketonic from the non-ketonic reaction products. Separation of the pregnenolone from the dehydroandrosterone with the aid of digitonin is not possible since dehydroandrosterone, pregnenolone, and, in fact, practically all compounds having the cholesterol configuration of rings A and B and a hydroxyl group at the 3-position, as is known, form sparingly soluble digitonides. Hence, if the mixture containing the various 3-hydroxy compounds were treated with digitonin, all of the specified 3-hydroxy compounds would form sparingly soluble digitonides and no separation would be accomplished. Digitonin is therefore not an agent for the separation of pregnenolone from dehydroandrosterone and sterically related 3-OH compounds.

We have found that a separation of $\Delta^{5,6}$-pregnenol-3-one-20 from other substances capable of forming difficultly soluble or insoluble digitonides, such as dehydroandrosterone, can be accomplished in a convenient and efficient manner if the pregnenolone and the other hydroxyl containing bodies are in the form of esters, such as the acetic acid, propionic acid, butyric acid, benzoic acid or other carboxylic acid esters. Thus, if the 3-hydroxyl groups in a mixture of pregnenolone with, for example, dehydroandrosterone, or other 3-hydroxylated or other acylable compounds capable of being precipitated by digitonin are first converted into their 3-esters and the resulting mixture of esters treated with digitonin, the pregnenolone acetate will be precipitated practically quantitatively in the form of an insoluble digitonide, while the other esters remain in solution. Thus, the same oxidation mixture which yielded only traces of pregnenolone when worked up by the method of Ruzicka and Fisher, supra, readily yielded by our method of separation from 10 to 15 times as much pregnenolone. This means not only a more efficient recovery of a valuable by-product, but also a higher yield of the other or primary reaction products and in purer form.

In working up, for example, a reaction mixture obtained by the oxidation of cholesterol acetate dibromide, the first semi-carbazones obtained on reacting the mixture with semi-carbazide are quite pure dehydroandrosterone acetate semi-carbazones, but a small amount of pregnenolone acetate semi-carbazone is also present and will eventually be found as pregnenolone acetate in the mother liquors from the recrystallization. Our invention makes it possible to isolate these small amounts of pregnenolone acetate from these mother liquor substances by reacting the same with digitonin, which separates only the ester of the pregnenolone.

This reaction is contrary to the general rule that $\Delta^{5,6}$-pregnenol-3-one-20-acetate should not be precipitable with digitonin, and hence should not be separable from, for example, dehydroandrosterone acetate by reaction of the mixture with digitonin. We have, however, found that, contrary to expectations, pregnenolone acetate, and likewise other esters of pregnenolone, form insoluble digitonides and can accordingly be easily separated from the 3-esters and other 3-derivatives of dehydroandrosterone and similar compounds.

The invention will be explained in greater detail with the aid of the following examples which are presented by way of illustration only:

Example 1

The quantitative precipitation of $\Delta^{5,6}$-pregnenol-3-one-20 acetate by digitonin is illustrated by the following:

500 mgm. of pure pregnenolone acetate were dissolved in 20 cc. of methyl alcohol, 3 grams of digitonin were separately dissolved in 20 cc. of hot methyl alcohol. The digitonin solution was poured into the solution of pregnenolone acetate and the whole brought to a boil. 4 cc. of hot water were added with stirring. A heavy precipitate formed in a short while. After standing over night, the precipitated material was filtered and boiled once with acetone and filtered again. Mother liquor and filtrate were joined and evaporated to dryness. The residue was taken up in ether, and filtered from the digitonin present. The ether was washed with water, dried and evaporated. On evaporating the ether there remained about 10 mgm. of a foreign material which probably was introduced along with the digitonin. The digitonide was split in the usual way by dissolving it in pyridine and precipitating with ether. After filtering off the digitonin, the filtrate was evaporated to dryness to rid it of pyridine and was again taken up in ether. It was filtered from the traces of insoluble material present and washed two times with 10% sulphuric acid, and finally with water until neutral. The ether after drying and evaporating yielded the original 500 mgm. of pregnenolone acetate.

Example 2

The lower melting semi-carbazones obtained from the chromic acid oxidation products of cholesterol acetate dibromide are split by any of the known methods and the resulting material acetylated in known manner by dissolving it in pyridine and adding acetic anhydride. After standing over night, the pyridine solution is poured into water and the precipitated substance filtered. The crystalline residue is taken up in ether and washed with acid, such as dilute hydrochloric or sulfuric, then with soda, and finally with water until neutral. The solution is dried and the ether evaporated. 20 grams of the resulting acetates are dissolved in 150 cc. of hot methyl alcohol. 40 grams of digitonin are separately dissolved in 250 cc. of hot methyl alcohol. The two solutions are joined and 60 cc. of hot water added, making the combined solution approximately 87% methyl alcohol. This is allowed to stand at room temperature over night. Within a half hour crystals of the digitonide begin to separate and in the morning the precipitate is quite heavy. This material is then filtered and washed thoroughly with acetone. After drying, it is dissolved in pyridine and precipitated with acetone. The precipitated digitonin is filtered and washed with acetone. The combined filtrates and washings are evaporated to dryness and taken up in ether. The small amount of insoluble material is filtered. The ether solution is washed with water, 10% sulfuric and finally with water until neutral. On evaporating to dryness, 7 grams of crude $\Delta^{5,6}$-pregnenol-3-one-20 acetate are obtained. Recrystallization from dilute acetone and methyl alcohol yields pregnenolone acetate, melting at 144–146° C.

Example 3

The material is worked up just as in Example 2 except that 85% ethyl alcohol is used as the solvent for the acetylated material and the digitonin. The yield of pregnenolone acetate is the same as above.

Example 4

20 grams of the crude acetates obtained as described in Example 2 are dissolved in 150 cc. of methyl alcohol. 40 grams digitonin are dissolved in 250 cc. methyl alcohol and the two solutions joined. 40 cc. of hot water are added so that the solution is about 90% methyl alcohol. This is allowed to stand over night and the precipitated digitonide is filtered. The mother liquors are then evaporated to a small volume and a large amount of acetone added. The precipitated material is filtered and joined with the first fraction of digitonide. The filtrate is evaporated to dryness and the residue taken up in ether. The ether insoluble material is filtered and joined with the digitonides previously obtained. The combined digitonides and digitonin are taken up in pyridine and precipitated with ether. The digitonin is filtered from the solution and the filtrate evaporated to dryness. The residue is taken up in ether, filtered from the traces of digitonin present, washed with 10% sulfuric and then with water until neutral. On evaporating the ether solution, 7 grams of crude pregnenolone acetate are obtained. This, on crystallization from dilute acetone and methyl alcohol, yields a good melting pregnenolone acetate.

Example 5

20 grams of the oily mother liquor substance obtained in the recrystallization of dehydroandrosterone acetate, obtained as described, for example, by the oxidation of cholesterol acetate dibromide followed by debromination, as by zinc dust and acetic acid, are treated as in Example 4. The yield is ½ gram of $\Delta^{5,6}$-pregnenol-3-one-20 acetate.

While in the at present preferred application of our invention described in the examples we employ as the starting material a mixture obtained by the chromic acid oxidation of cholesterol acetate dibromide, our invention can be utilized in the separation of pregnenolone from any mixture, natural or synthetic, which contains substances which are non-precipitable, or can be converted into compounds which are non-precipitable by digitonin. Our invention is accord-

We claim:

1. The method of separating $\Delta^{5,6}$-pregnenol-3-one-20 and its esters from admixture with an esterifiable compound which is precipitable with digitonin which comprises esterifying the mixture, reacting the same with digitonin, and separating the digitonide of the pregnenolone ester.

2. The method of separating $\Delta^{5,6}$-pregnenol-3-one-20 and its esters from admixture with an esterifiable compound which is precipitable with digitonin which comprises acetylating the mixture, reacting the same with digitonin, and separating the digitonide of the pregnenolone ester.

3. The method of separating $\Delta^{5,6}$-pregnenol-3-one-20 and its esters from a sterol oxidation mixture containing a plurality of at least one of the members of the group consisting of hydroxy ketones and their esters, which comprises reacting the mixture with a reagent capable of forming, with the ketones of the mixture, condensation products having different solubility characteristics from the other components of the mixture, separating the condensation products from said other components, decomposing the condensation products, esterifying any free hydroxyl group present in the ketonic substances, reacting the ester ketones with digitonin in a solvent for digitonin, and separating the precipitated digitonide of pregnenol-3-one-20 ester.

4. The method of separating a $\Delta^{5,6}$-pregnenol-3-one-20 ester from a mixture containing also a non-digitonin-precipitable derivative of digitonin-precipitable compounds which comprises reacting the mixture with digitonin, and separating the digitonide of the pregnenolone ester.

5. The method of separating a $\Delta^{5,6}$-pregnenol-3-one-20 ester from admixture with a solution of compounds which are not precipitable with digitonin, which comprises adding digitonin to the solution, and separating the digitonide of pregnenolone ester so produced.

6. The method of separating a $\Delta^{5,6}$-pregnenol-3-one-20 ester from admixture with a solution of compounds in a lower aliphatic alcohol which are not precipitable with digitonin, which comprises adding digitonin to the solution, and separating the digitonide of pregnenolone ester so produced.

7. The method of separating a $\Delta^{5,6}$-pregnenol-3-one-20 ester from admixture with a solution of compounds non-precipitable with digitonin in a solvent of the group consisting of methyl and ethyl alcohols, which comprises adding digitonin to the solution, and separating the digitonide of pregnenolone ester so produced.

8. The method of separating a $\Delta^{5,6}$-pregnenol-3-one-20 ester from admixture with a solution of compounds in a solvent in which digitonin is soluble which are not precipitable with digitonin, which comprises adding digitonin to the solution, and separating the digitonide of pregnenolone ester so produced.

9. The method of separating $\Delta^{5,6}$-pregnenol-3-one-20 from dehydroandrosterone which comprises esterifying the mixture, treating the esterified compounds in a common solvent with digitonin, and separating the digitonide of pregnenolone ester.

10. The method of separating pregnenol-3-one-20 from dehydroandrosterone which comprises esterifying the mixture, treating the esterified compounds in a lower aliphatic alcohol with digitonin, and separating the digitonide of pregnenolone ester.

11. The method which comprises splitting the lower melting semi-carbazones obtained by the chromic acid oxidation of cholesterol acetate dibromide, acetylating the mixture, pouring it into water, dissolving the separated acetates in a lower aliphatic alcohol, adding to the solution a solution of digitonin in alcohol, and then adding water to the mixture.

12. The digitonide of $\Delta^{5,6}$-pregnenol-3-one-20 esters.

13. The digitonide of $\Delta^{5,6}$-pregnenol-3-one-20 acetate.

14. The method of separating a $\Delta^{5,6}$-pregnenol-3-one-20 ester from admixture with a solution of compounds which are not precipitable with digitonin, which comprises adding digitonin to the solution, separating the digitonide of pregnenolone ester so produced, splitting the digitonide, and isolating the pregnenolone ester.

BRADLEY WHITMAN.
ERWIN SCHWENK.